(12) United States Patent
Lemaire et al.

(10) Patent No.: US 11,407,664 B2
(45) Date of Patent: Aug. 9, 2022

(54) METHOD FOR A WATER TREATMENT IN A SYSTEM COMPRISING AT LEAST ONE SEQUENCING BATCH REACTOR AND A MOVING BED BIOFILM REACTOR

(71) Applicant: Veolia Water Solutions & Technologies Support, Saint-Maurice (FR)

(72) Inventors: Romain Lemaire, Vernou sur Brenne (FR); Tristan Germain, Carrieres sous Poissy (FR); Daniel Lamarre, Montreal (CA)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 183 days.

(21) Appl. No.: 16/618,485

(22) PCT Filed: May 22, 2018

(86) PCT No.: PCT/EP2018/063374
§ 371 (c)(1),
(2) Date: Dec. 2, 2019

(87) PCT Pub. No.: WO2018/219718
PCT Pub. Date: Dec. 6, 2018

(65) Prior Publication Data
US 2020/0095146 A1 Mar. 26, 2020

(30) Foreign Application Priority Data
Jun. 2, 2017 (FR) ...................................... 1754924

(51) Int. Cl.
*C02F 3/30* (2006.01)
*C02F 3/08* (2006.01)
(Continued)

(52) U.S. Cl.
CPC .............. *C02F 3/302* (2013.01); *C02F 3/085* (2013.01); *C02F 3/121* (2013.01); *C02F 3/1263* (2013.01);
(Continued)

(58) Field of Classification Search
CPC .......... C02F 3/302; C02F 3/085; C02F 3/121; C02F 3/1263; C02F 3/308;
(Continued)

(56) References Cited

U.S. PATENT DOCUMENTS 7,189,323 B2 * 3/2007 Lofqvist ................... C02F 3/10
  210/615
8,623,213 B2 * 1/2014 Liu ........................ C02F 3/1221
  210/605

(Continued)

FOREIGN PATENT DOCUMENTS

CN          105601030 A  *  5/2016
FR          2673618 A1      9/1992

*Primary Examiner* — Nam X Nguyen
*Assistant Examiner* — Julia L. Wun
(74) *Attorney, Agent, or Firm* — Coats & Bennett, PLLC (57) ABSTRACT

The present invention concerns a method for biological treatment of carbon, nitrogen and optionally phosphorus in water, in a reactor system (1) comprising a sequencing batch reactor (SBR) (2) and a moving bed biofilm reactor (MBBR) (3). The method comprises a step (10) of filling said SBR reactor (2) with water to be treated (5), a step (20) of anoxic/aerobic biological treatment in said reactor system (1) and a step (30) of discharging treated water (35) from said SBR reactor (2). The anoxic/aerobic biological treatment step (20) comprises: a biological treatment (210) under largely anoxic conditions in the SBR reactor (2), producing a first effluent (215), a biological treatment (220) under aerobic conditions in the MBBR reactor (3), producing a second effluent (225), and a continuous recirculation of the (Continued)

first and second effluents. The present invention also concerns a corresponding facility.

7 Claims, 3 Drawing Sheets

(51) Int. Cl.
*C02F 101/10* (2006.01)
*C02F 101/16* (2006.01)
*C02F 3/12* (2006.01)

(52) U.S. Cl.
CPC ........ *C02F 3/308* (2013.01); *C02F 2101/105* (2013.01); *C02F 2101/16* (2013.01); *C02F 2209/22* (2013.01); *C02F 2301/04* (2013.01)

(58) Field of Classification Search
CPC ............ C02F 2101/105; C02F 2101/16; C02F 2209/22; C02F 2301/04; Y02W 10/10
USPC ................................................ 210/605, 622
See application file for complete search history.

(56) References Cited

U.S. PATENT DOCUMENTS

| | | |
|---|---|---|
| 2005/0252854 A1 | 11/2005 | Krier |
| 2008/0053897 A1 | 3/2008 | Zhu et al. |
| 2014/0238931 A1 | 8/2014 | DiMassimo et al. |
| 2015/0321937 A1 | 11/2015 | Zhao et al. |
| 2016/0289107 A1 | 10/2016 | Seidl et al. |

* cited by examiner

Fig. 4

METHOD FOR A WATER TREATMENT IN A SYSTEM COMPRISING AT LEAST ONE SEQUENCING BATCH REACTOR AND A MOVING BED BIOFILM REACTOR

This application is a U.S. National Stage Application of PCT Application No. PCT/EP2018/063374, with an international filing date of 22 May 2019. Applicant claims priority based on French Patent Application No. 1754924 filed 2 Jun. 2017. The subject matter of these applications is incorporated herein.

1. FIELD OF THE INVENTION

The invention relates to the field of the treatment of water, especially waste water, with a view to its cleansing.

More specifically, the invention relates to a method for the biological treatment of carbon, nitrogen and, optionally, phosphorous in water as well to a corresponding installation or plant.

2. PRIOR ART

A method is known in the prior art for treating waste water in a conventional type of sequencing batch reactor with free biomass or suspended biomass (especially activated sludge). The sequencing batch reactor, also known by its acronym, SBR, is now widely used throughout the world and is especially appreciated because it can be implemented with only one biological basin without any need for a downstream clarifier structure, contrary to a classic activated sludge method which, owing to continuous feeding with water, requires that a clarifier structure should be downstream from the biological basin and that a recirculation of the sludges be established towards the biological basin. Thus, the footprint of an installation implementing a suspended-biomass SBR method of the conventional type is smaller than that of an installation implementing a classic activated-sludge method. Depending on the quantity of waste water to be treated, several of these biological basins can if necessary be placed in parallel.

One cycle of the method of biological treatment of water in a conventional type of suspended-biomass SBR reactor of the conventional type comprises the following steps in succession:

filling the reactor with water to be treated;

carrying out biological treatment in the reactor, consisting of an alternation of anaerobic, anoxic and aerobic conditions with or without aeration;

decantation or settling of the suspended biomass and of the suspended solids; and, clarification/draining of the treated water.

Biological treatment under aerobic conditions enables the degradation of the carbon as well as the conversion of ammonium ($NH_4^+$) into nitrate ions ($NO_3^-$) (nitrification) through a specific nitrifying biomass. Biological treatment under anoxic conditions enables the elimination of the nitrate ions ($NO_3^-$) in diatomic nitrogen gas ($N_2$) (denitrification) through a denitrifying heterotrophic biomass. If necessary, the phosphorous can be eliminated either biologically or by physical/chemical means by the addition of metal salts such as iron salts or aluminum salts. The elimination of the phosphorous by biological means requires a phase with anaerobic conditions during which the appropriate biomass releases phosphorous and consumes exogenous carbon to create internal stores and a phase with aerobic conditions and/or anoxic conditions during which the same biomass over-accumulates a large part of the phosphorous present in the reaction medium through its internal reserves of carbon which give it the required energy source.

Variants of the above-described method that optimize the performance of the treatment are obtained by compartmentalizing the activated sludge SBR reactor. This is called a method of treatment in a compartmentalized type suspended-biomass SBR reactor. For example, when an intensive denitrification of the effluent is needed, a compartment can be added at the head of the suspended-biomass SBR reactor This compartment is used in anoxic conditions and with stirring. This configuration requires the establishment of a sequential recirculation of the combined liquor (suspended biomass and effluent) by means of a pump between the head compartment used under anoxic conditions and the other compartment. The recirculation must be stopped especially during the settling and draining phases of the compartmentalized type suspended-biomass SBR reactor. The compartments used under anoxic conditions make it possible to obtain higher performance in the biological denitrification of the water to be treated. Indeed, the water to be treated introduced into the head compartment is charged in COD (Chemical Oxygen Demand), i.e. it constitutes an abundant source of carbon that enables the maintenance of a high concentration of denitrifying bacteria. Another example is that when biological dephosphatation is necessary, it is possible to use a two-compartment suspended-biomass SBR reactor with one first compartment under anaerobic conditions and one second compartment under alternately anoxic and aerobic conditions or else a three-compartment suspended-biomass SBR reactor with a first compartment under anaerobic conditions, a second compartment under anoxic conditions and the third compartment under aerobic conditions. This configuration also requires the setting up of a sequential recirculation of the combined liquor (suspended biomass and effluent) by means of a pump between the head compartment used under anaerobic conditions and the other compartment or compartments. Similarly, the recirculation must be stopped especially during the phases of decantation (settling) and draining of the SBR reactor.

The methods of biological treatment of water in a conventional type or compartmentalized type of suspended-biomass SBR nevertheless have many drawbacks. A first drawback is that, because of the low speed of decantation of the suspended solids (constituted chiefly by purifying suspended biomass), these methods require the implementation of reactors having a large volume. A second drawback of these suspended-biomass SBR methods is that they have limited processing performance, especially limited performance for nitrification. Indeed, the concentration in activated sludge in the SBR reactor is often limited, in practice to strictly below 5 g/L so as not to impair the clarification step. A third drawback of these conventional type SBR methods is that it is necessary to maintain a great sludge age in the SBR reactor, in practice a sludge age that is strictly greater than 15 days at 12° C., in order to obtain a sufficient level of nitrification. This implies a considerable increase in the size of the water treatment installations.

In order to reduce the volume of the reactor, a method of treatment in a hybrid SBR reactor, called an integrated fixed film activated sludge-sequencing batch reactor has been developed and is described especially in the US patent document 2015321937 A1. This type of reactor is also commonly known under its abbreviation 'IFAS-SBR'. An IFAS-SBR reactor is formed by two compartments hydraulically connected by one aperture: the first compartment contains a biomass of suspended bacteria and the second compartment contains a carrier medium of fixed bacteria as well as suspended biomass. The use of carrier media for fixed bacteria in the second compartment makes it possible to obtain more efficient nitrification and therefore reduce the size of the plant. Besides, a recirculation device using a pump makes it possible to obtain a recirculation of effluent from the second compartment to the first compartment. When an IFAS-SBR type reactor is used for nitrification-denitrification type treatment, the first compartment is under anoxic conditions while the second compartment is under aerobic conditions.

The methods of biological treatment of water in an IFAS-SBR reactor however have several drawbacks. A first drawback is that the gain in volume compared with conventional type or compartmentalized type suspended-biomass SBR reactors is limited. In practice, this gain is only 20% to 30%, because the fixed bacteria carrier media occupy much more space during the settling phase in the IFAS-SBR reactor and limit the volume of water that can be treated at each cycle. A second drawback is that the rehabilitation of an existing conventional type of SBR reactor is fairly complex because it necessitates a draining of the reactor and the building of a new internal partition within the SBR reactor. This implies a period of immobilization of the conventional type SBR reactor during the rehabilitation as an IFAS-SBR reactor.

In order to overcome the drawbacks related to the use of a suspended biomass in the previously described SBR reactors, a method of biological processing in a conventional type SBR reactor which however uses a biomass constituted by granules with a diameter of 1 mm or more instead of a suspended biomass has been developed and is described especially in the patent document EP1542932B1. This method enables the biological treatment of carbon, nitrogen and, optionally, phosphorous without any addition of metal salts to eliminate phosphorous. Since the granules have a density higher than that of the suspended biomass particles, their settling speed is far greater than that of the suspended biomass particles, which then makes it possible to obtain shorter operating cycle times for the SBR reactor and therefore smaller sizes of installations. The concentration in biomass in a SBR reactor constituted by granules can attain 8 to 10 g/L instead of 5 g/L in a conventional type of suspended biomass SBR reactor.

The methods of treatment in a SBR reactor with biomass constituted by granules have the drawback however of being unreliable, especially for aerobic granules. Apart from the difficulty of obtaining conditions favorable to the formation of said granules, it sometimes happens that these granules are lost, either because of a problem of hydraulics in the reactor (loss with water during the filling/draining steps) or following the destructuring of the granules during a malfunction of the biological treatment.

There is also a known prior-art method of biological treatment in a moving-bed biofilm reactor (MBBR) working in SBR mode, also called a sequencing batch moving-bed biofilm reactor (SBMBBR). This method also makes it possible to overcome problems relating to the use of a suspended biomass that settles far too slowly. This method using a fixed culture on media combines the advantages of the MBBR method (resistance to load variations, absence of bulking, physical and biological heterogeneity of the biomass, preservation of the biomass on carriers) is interesting because of time shifting or time lagging of the biological reactions of the cycle of an SBR reactor by alternation of anaerobic/aerobic/anoxic phases. It can be used for the treatment of phosphorous especially. The absence of suspended biomass in the reactor enables the total or almost total draining of the liquid contained in the reactor at the end of the SBR cycle and enables this result without any preliminary settling, contrary to the SBRs using suspended biomass or biomass constituted by granules. The reactor is provided with perforated screens used to retain the media in the biological vessel while letting through the purified water as well as the suspended solids during the draining phases. This particular feature makes it possible to obtain a very compact SBMBBR reactor. Nevertheless, the drained treated water contains suspended solids of the order of 100 to 500 mg/L coming from the water to be treated as well as the detachment of the superficial parts of the biofilm. The water treated in an SBMBBR reactor generally requires a step of separation of these suspended solids downstream through a settling tank, a flotation tank or a micro-filter. The structure used for this step of separation can be especially compact because of the low concentration in SS (suspended solids).

Tests were carried out in an SBMBBR reactor on synthetic or semi-synthetic municipal waste water by implementing anaerobic/aerobic cycles without limitation of dissolved oxygen, in other words, with an uncontrolled aeration and therefore high concentrations of diatomic oxygen with KMT and also K1 type carriers (see Helness H, "*Biological phosphorus removal in a moving bed biofilm reactor*", Trondheim, Norwegian University of Science and Technology, 2007, pages 85-96; FIG. 37). The results obtained by Helness are promising for the treatment of carbon, nitrogen and phosphorous in the tested water. However, the tests took place with municipal water having low $NH_4$ and $PO_4$ concentrations, doped with acetate (favorable to the biological treatment processing of the phosphorous because this is organic carbon easily used by dephosphating bacteria) and having COD-NTK (Chemical Oxygen Demand-Nitrogen Total Kjeldhal) ratio that is advantageous for the treatment of nitrogen (COD-NTK ratio greater than or equal to 10). Besides, the results of the concentration profiles during a treatment cycle shows a time lag between the biological assimilation of phosphorous and denitrification. Indeed, the limiting step is that of nitrification which requires the constitution of aeration for 75 minutes whereas phosphorous ($PO_4$) has already been consumed. The inventors of the present invention have renewed these tests on an SBMBBR reactor treating real municipal water that is more concentrated in nitrogen than the water tested by Helness, without any exogenous addition of organic matter and with a COD-NTK ratio of 5:8 (and therefore less favorable for the overall treatment of nitrogen). They were then able to confirm this lag between the time necessary to over-accumulate phosphorus and to finish the nitrification during the aeration step of the SBMBBR reactor. Thus, the methods of biological treatment of carbon, nitrogen and phosphorous in water in a sequencing batch moving-bed biofilm reactor has the drawback of having a step of aeration that is particularly lengthy, leading to over-consumption of diatomic oxygen and therefore over-consumption of energy in the corresponding installation and that also leads to a lengthening of the water treatment and hence to extra-sizing needed for the corresponding installation.

3. GOALS OF THE INVENTION

The present invention is aimed at overcoming at least some of the drawbacks of the prior art referred to.

One goal of the invention especially is to propose an improved method of biological treatment of carbon, nitrogen and, optionally, the phosphorous contained in water, especially as regards nitrification.

It is another goal of the invention to propose a flexible, stable and robust method for the improved biological treatment of the carbon, nitrogen and, optionally, phosphorous contained in water that is flexible, stable and robust.

It is another goal of the invention, in at least certain embodiments of the invention, to propose a method that is competitive in terms of energy.

It is another goal of the invention to propose an installation for the biological treatment of the carbon, nitrogen and, optionally, phosphorous contained in water and which, for a given volume of water to be treated, is the most compact as possible installation.

4. SUMMARY OF THE INVENTION

The invention relates to a method of biological treatment of the carbon, nitrogen and, optionally, phosphorous in water, in a system of reactors comprising at least one sequencing batch reactor (SBR) and one moving-bed biofilm reactor (MBBR). The method comprises the steps of:

filling the at least one sequencing batch reactor with water to be treated;

carrying out anoxic/aerobic biological treatment in the system of reactors of the water present in the at least one sequencing batch reactor; and, removing treated water from the (at least one) sequencing batch reactor.

The step of anoxic/aerobic biological treatment in said system of reactors comprises:

biological treatment under predominantly anoxic conditions by a first biomass in the (at least one) sequencing batch reactor producing a first effluent, the first biomass comprising mainly heterotrophic microorganisms with denitrifying effect;

biological treatment under aerobic conditions by a second biomass in said moving-bed biofilm reactor, producing a second effluent, the second biomass comprising a predominantly nitrifying biofilm carried on media; and continuous recirculation of said first and second effluents between the at least one sequencing batch reactor and the moving-bed biofilm reactor.

The term "aerobic" is understood to mean the presence of molecular oxygen in a reaction medium. The concentration in dissolved diatomic oxygen is then generally greater than or equal to 1 mg/LL.

The term "anaerobic conditions" is understood to mean the total or quasi-total absence of diatomic oxygen in a reducing reaction medium, i.e. a medium that does not especially comprise oxidized forms of nitrogenous compounds such as nitrate ions ($NO_3^-$) or nitrite ions ($NO_2^-$) for example. The concentration in dissolved diatomic oxygen is then close to 0 mg/L.

The term "anoxic conditions" is understood to mean the total or quasi-total absence of dissolved diatomic oxygen in an oxidizing reaction medium, i.e. a medium comprising oxidized forms of nitrogenous compounds such as nitrate ions ($NO_3^-$) or nitrite ions ($NO_2^-$) for example. The concentration in dissolved diatomic oxygen is then close to 0 mg/L.

The expression biological treatment under "predominantly" anoxic conditions refers to the fact that the reaction medium is under totally anoxic conditions for more than 50%, or more than 60%, or more than 70%, or more than 80%, or more than 90%, or more than 95% of the total duration of the treatment. Indeed, there may exist transitional periods which may or may not be provoked where the reaction medium can be under aerobic and/or anaerobic conditions. Preferably, the reaction medium of the biological treatment in predominantly anoxic conditions is in totally anoxic conditions for more than 90% of the total duration of the treatment. In an extremely preferable way, the reaction medium of the biological treatment in predominantly anoxic conditions is under totally anoxic conditions for more than 95% of the total duration of said treatment.

The term "mainly" refers to heterotrophic micro-organisms with denitrifying effect, i.e. the fact that the first biomass is formed by a set of micro-organisms among which more than 50%, or more than 60%, or more than 70%, or more than 80%, or more than 90% are heterotrophic micro-organisms with denitrifying effect.

Similarly, the expression "predominantly nitrifying" refers to the fact that the second biomass comprises chiefly micro-organisms capable of nitrification.

The term "effluent" refers to the liquid fraction of water under biological treatment that can be recirculated from one reactor to another reactor comprising suspended particles, including as the case may be, suspended biomass.

In the following description, the term "sequencing batch reactor" could appear under its acronym SBR and the term moving-bed biofilm reactor could appear under its acronym "MBBR".

The present invention therefore relies on the placing in parallel of an MBBR reactor with one or more SBR reactors. The MBBR reactor, used only during the step of anoxic/ aerobic biological treatment, is used only under aerobic conditions enabling an optimal development of the micro-organisms of the biofilm with nitrifying effect. Thus, the nitrification of water under treatment takes place chiefly in the MBBR reactor. The (at least one) SBR reactor used predominantly in anoxic conditions during the step of anoxic/aerobic biological treatment enables optimum growth of the heterotrophic micro-organisms with denitrifying effect. The continuous circulation of the first and second effluents provides for continuous alternation of anoxic conditions and aerobic conditions for the water under treatment. The method according to the invention thus enables efficient and energy-competitive biological treatment of the carbon, nitrogen and, optionally, the phosphorous in water. The installations implementing this method can be very compact.

The step for filling the (at least one) sequencing batch reactor with water can be carried out with higher or lower rapidity. The duration of filling can especially be from 10 minutes to 4 hours.

The filling step is advantageously performed under anaerobic conditions. This makes it possible especially to initiate the mechanisms of biological dephosphatation through the presence in the first biomass of micro-organisms capable of accumulating polyphosphates, known as "polyphosphate accumulative organisms" or PAO. A degradation or reduction of the soluble organic carbon of the water present in the SBR reactor and an increase in inorganic phosphorous is observed, the release of inorganic phosphorous by the PAO micro-organisms being an essential step for dephosphatation. According to one particular embodiment, the method according to the invention furthermore comprises a step of biological treatment under anaerobic conditions in said at least one sequencing batch reactor. This additional step of biological treatment under anaerobic conditions is then implemented before said step of anoxic/ aerobic biological treatment. It can last 10 minutes to 3 hours. This embodiment is particularly promising when the filling step is carried out rapidly, i.e. for a duration of the order of some tens of minutes and/or when an intensive dephosphatation of the water to be treated is necessary. This additional step enables an increased initiation of the biological dephosphotation mechanisms through the presence, in the first biomass, of polyphosphate accumulative organisms. This additional step also reduces the quantity of exogenous carbon and therefore the C:N ratio of the water.

Preferably, the first biomass comprises denitrifying polyphosphate accumulative organisms. These micro-organisms are PAOs capable of accumulating polyphosphates by using nitrate ions or nitrite ions rather than diatomic oxygen, their energy source coming from the internal carbon reserves constituted during the previous anaerobic step. They are also known as DPAO. This especially has the advantage of enabling a method in which the dephosphatation and the nitrification are decoupled and in which, on the contrary, the dephosphatation and the denitrification are coupled.

The step of anoxic/aerobic biological treatment is implemented by continuous recirculation of the first and second effluents between the (at least one) sequencing batch reactor and the moving-bed biofilm reactor. The recirculation especially makes it possible to obtain continuous alternation of anoxic conditions and aerobic conditions for the water under treatment. The step of anoxic/aerobic biological treatment can have a duration of 1 hour to 8 hours.

Biological treatment under predominantly anoxic conditions by the first biomass of the (at least one) SBR reactor during the step of anoxic/aerobic biological treatment provides for the denitrification of water under treatment by transformation of the nitrate ions ($NO_3^-$) into diatomic nitrogen ($N_2$) and, optionally, the dephosphatation of water under treatment by polyphosphates accumulation in the bacteria. The denitrification is obtained by heterotrophic micro-organisms with denitrifying effect coming from the first biomass. The dephosphatation, as the case may be necessary, is provided by PAO micro-organisms, preferably DPAO micro-organisms.

The first biomass is a suspended biomass, a granular biomass or a biofilm carried on media.

According to a first embodiment, the first biomass is a suspended biomass. In this embodiment, the first effluent comprises suspended particles including suspended biomass elements.

According to a second embodiment, the first biomass is a biofilm carried on media. In this embodiment, the first effluent comprises suspended particles but no biofilm supported on media. This embodiment is particularly preferred because of the many technical advantages procured as compared with suspended biomass. Biofilm carried on media makes it possible especially to obtain a higher concentration of biomass; an intensive denitrification can therefore be implemented with installations that could be more compact. A biofilm carried on media enables increased selection of the micro-organisms of interest, in this case mainly heterotrophic micro-organisms with denitrifying effect and in certain cases also PAO or DPAO micro-organisms. The biofilm also makes it possible to easily obtain a greater sludge age for an activated sludge method enabling better growth for the heterotrophic micro-organisms with denitrifying effect or even PAO or DPAO micro-organisms. The biofilm has a better response to the variations in COD and a better resistance to toxic shock if any.

Biological treatment under aerobic conditions by the second biomass of the MBBR reactor during the step of anoxic/aerobic biological treatment provides for nitrification by transformation of the ammonium ($NH4^+$) into nitrate ions ($NO3^-$). Since the MBBR reactor is used solely under aerobic conditions in the method according to the invention, the micro-organisms of the biofilm with nitrifying effect can have optimum growth and therefore increased performance. The growth of the micro-organisms and their performance are all the better as the ratio C:N is low.

The second biomass comprises a biofilm with nitrifying effect. The biofilm with nitrifying effect is a set of micro-organisms that are adhesive with each other and adhesive with the surface of carrier media. The biofilm carried on media procures numerous advantages as compared with the suspended biomass. A biofilm carried on media also makes it possible especially to obtain a higher concentration of biomass; an intensive nitrification can therefore be implemented with installations that can be more compact. A biofilm supported on media enables an increased selection of micro-organisms of interest, in this case micro-organisms with nitrifying effect. The biofilm makes it possible to easily obtain a higher sludge age than in the case of an activated-sludge method enabling better growth for the micro-organisms with nitrifying effect. The biofilm has a better response to variations in COD and a better resistance to toxic shock if any.

In the first embodiment according to which the first biomass is a suspended biomass, the second effluent comprises suspended solids including elements of suspended biomass coming from the first biomass. In the second embodiment according to which the first biomass is a biofilm carried on media, the second effluent comprises suspended solids but not biofilm carried on media coming from the first biomass.

Preferably, the concentration in dissolved diatomic oxygen in said second effluent ranges from 1 milligram to 6 milligrams per liter. The concentration in diatomic oxygen does not generally need to be greater since the nitrification is optimised by the use of biofilm with nitrifying effect for the second biomass and since the dephosphatation, if necessary, takes place chiefly in the SBR under anoxic conditions.

According to one particular embodiment of the invention, the system of reactors comprises at least two sequencing batch reactors disposed in parallel. The term "disposed in parallel" refers to the fact that the water to be treated entering each of said at least two sequencing batch reactors can come from a same stream of water to be treated and the fact that the treated water exiting from each of said at least two sequencing batch reactors can be recombined into a same stream of treated water.

According to this embodiment, the method comprises the steps of:
  filling each of said at least two sequencing batch reactors with water to be treated;
  carrying out anoxic/aerobic biological treatment, in the system of reactors, of the water present in the at least two sequencing batch reactors actor; and,
  removing treated water from each of the at least two sequencing batch reactors;
The step of anoxic/aerobic biological treatment in the system of reactors comprises:
  biological treatment under predominantly anoxic conditions by a first biomass in each of said two sequencing batch reactors, each producing a first effluent, the first biomass of each of said sequencing batch reactors comprising heterotrophic microorganisms with denitrifying effect;

biological treatment under aerobic conditions by a second biomass in the moving-bed biofilm reactor, producing a second effluent, the second biomass comprising a predominantly nitrifying biofilm carried on media; and a continuous recirculation of each of the first and second effluents between each of said two sequencing batch reactors and the moving-bed biofilm reactor.

The system of reactors can especially comprise 2, 3, 4 or 5 sequencing batch reactors.

Advantageously, the step of anoxic/aerobic biological treatment is implemented with each of said at least two sequencing batch reactors sequentially. This means that the step of anoxic/aerobic biological treatment takes place by turns between the MMBR reactor and each of said at least two SBR reactors. This enables the use of a single MMBR reactor with nitrifying effect with a set of SBR reactors in parallel. The MBBR reactor can then have a generally continuous operation.

The invention also relates to an installation for the biological treatment of carbon, nitrogen and, optionally, phosphorous in water to be treated, comprising a moving-bed biofilm reactor (MBBR) and at least one sequencing batch reactor (SBR).

The (at least one) sequencing batch reactor comprises means for leading in the water to be treated, means for removing treated water and means for recirculating a first effluent from the (at least one) sequencing batch reactor towards the moving-bed biofilm reactor. The moving-bed biofilm reactor comprises means of aerating means of recirculating a second effluent coming from said moving-bed biofilm reactor to the (at least one) sequencing batch reactor.

According to a preferred characteristic of the invention, the (at least one) sequencing batch reactor comprises stirring means. The at least one) sequencing batch reactor can also comprise airing means.

According to another preferred characteristic of the invention, the moving-bed biofilm reactor can include additional stirring means in addition to the airing means already present. These stirring means are generally optional since the moving-bed biofilm reactor is meant to work exclusively in aerobic mode and therefore to be aerated continuously, thus inducing sufficient stirring. According to another preferred characteristic of the invention, the (at least one) sequencing batch reactor is a suspended biomass or granular biomass sequencing batch reactor or a sequencing moving-bed biofilm reactor. The (at least one) sequencing batch reactor is advantageously a sequencing batch moving-bed biofilm reactor (SBMBBR).

According to another preferred characteristic of the invention, the sequencing batch moving-bed biofilm reactor comprises a perforated screen used to retain biofilm carrier media. Should the (at least one) sequencing batch reactor be a sequencing batch moving-bed biofilm reactor, it can also comprise a perforated screen enabling the supporting media of the biofilm to be retained.

According to another preferred characteristic of the invention, the installation according to the invention comprises at least two sequencing batch reactors disposed in parallel. The installation can comprise especially 2, 3, 4 or 5 sequencing batch reactors disposed in parallel.

5. LIST OF FIGURES

The invention, as well as its different advantages, shall be understood more clearly from the following description of a non-restrictive embodiment, given with reference to the appended figures, of which.

6. DESCRIPTION OF DETAILED EMBODIMENTS OF THE INVENTION

Figure 1:
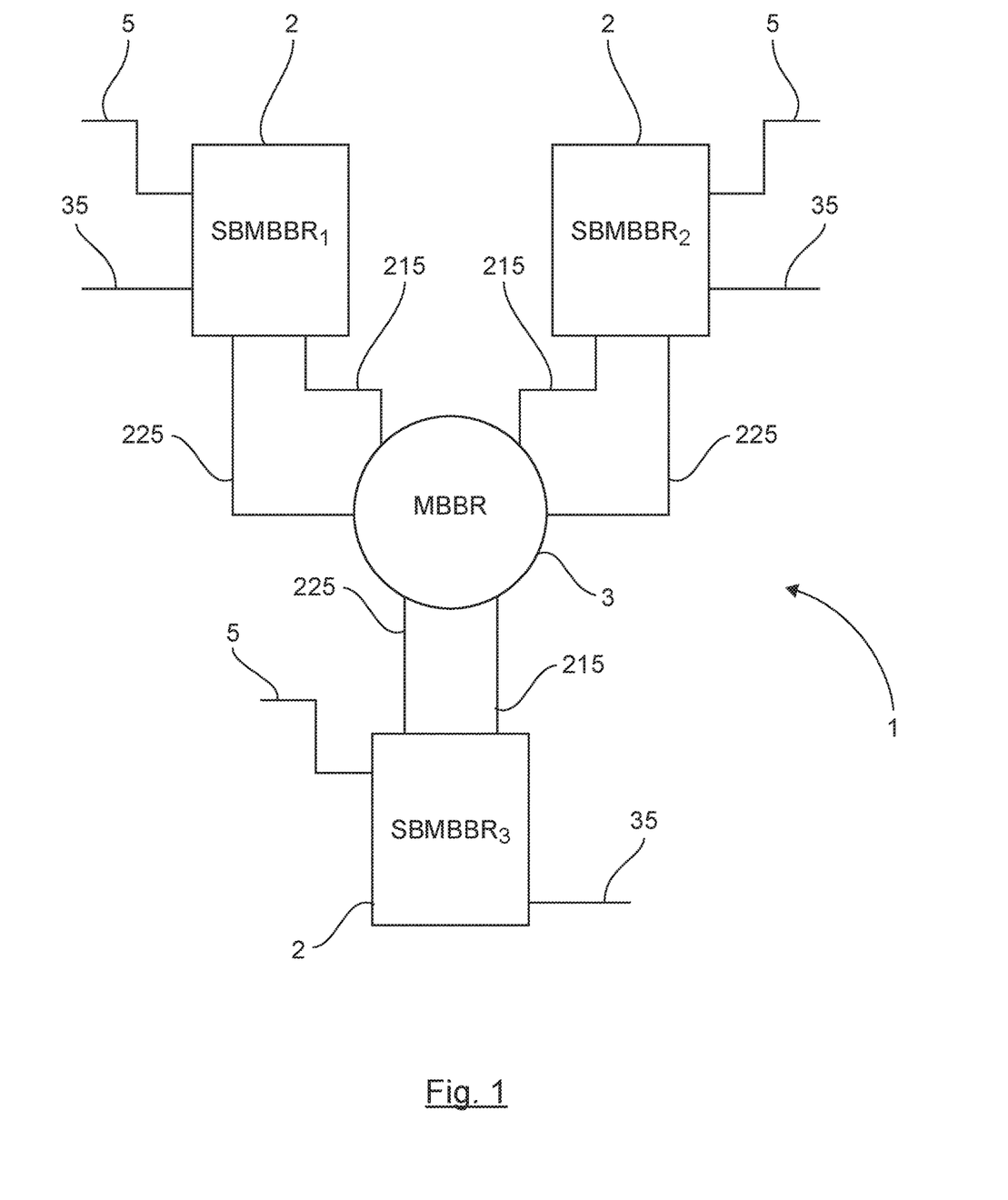
FIG. 1 represents a system of reactors according to the present invention comprising an MBBR reactor and three SBMBBR reactors disposed in parallel.
Figure 2A:
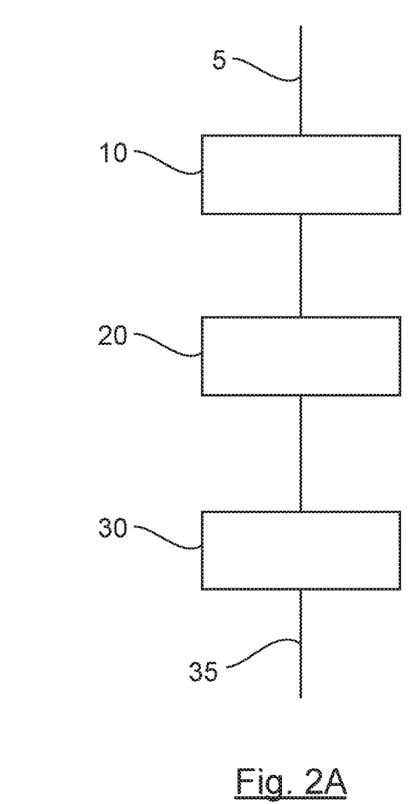
FIG. 2A represents the steps of the method according to the present invention in the system of reactors according to FIG. 1.
Figure 2B:
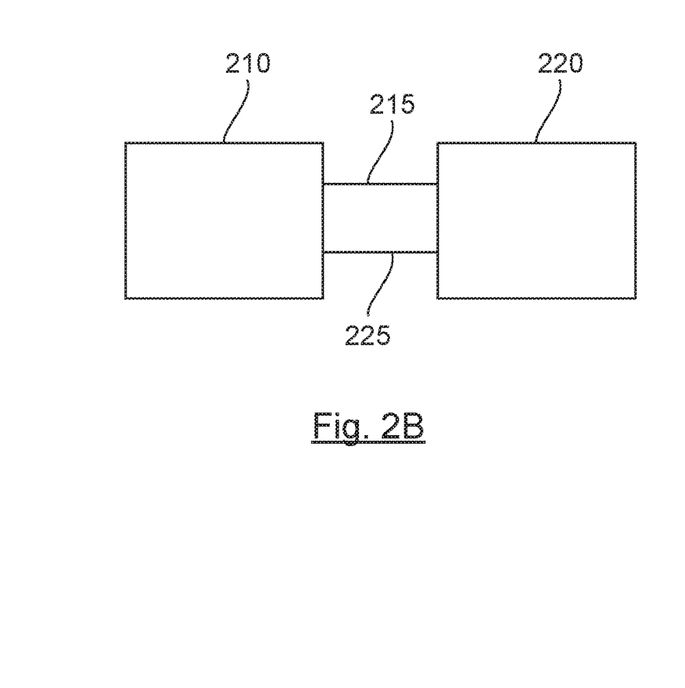
FIG. 2B provides a detailed view of the step of anoxic/aerobic biological treatment in the system of reactors according to FIG. 1.

Referring to FIG. 1, the system of reactors 1 comprises three sequencing batch moving-bed biofilm reactors 2, $SBMBBR_1$, $SBMBBR_2$, and $SBMBBR_3$ and one moving-bed biofilm reactor 3, MBBR. Referring to FIGS. 2a and 2b, the method of biological treatment of carbon, nitrogen and, optionally, phosphorous in water, in the system of reactors 1 comprises the steps of:

filling 10 each of the three sequencing batch moving-bed biofilm reactors 2 with water to be treated 5;

carrying out anoxic/aerobic biological treatment 20, in the system of reactors 1, of the water present in the three sequencing batch moving-bed biofilm reactors 2; and removing 30 treated water 35 from each of the sequencing batch moving-bed biofilm reactors 2.

The step of anoxic/aerobic biological treatment 20 in the MBBR reactor 3 and one of the SBMBBR reactors 2, for example $SBMBBR_1$, comprises:

biological treatment 210 in predominantly anoxic conditions by a first biomass fixed on media in the SBMBBR 2, producing a first effluent 215, the first biomass comprising heterotrophic micro-organisms with nitrifying effect;

biological treatment 220 in aerobic conditions by a second biomass in the MBBR 3 producing a second effluent 225, the second biomass comprising a biofilm with nitrifying effect carried on media; and continuous recirculation of the first effluent 215 towards the MBBR reactor 3 and of the second effluent 225 towards the reactor $SBMBBR_1$ 2.

The step of anoxic/aerobic biological treatment 20 also takes place firstly in the MBBR reactor 3 and the reactor $SBMBBR_2$ and secondly in the MBBR reactor 3 and the reactor $SBMBBR_3$ simultaneously or not simultaneously. One particular mode where the biological treatment is implemented sequentially is presented here below with reference to FIG. 4.

The reactors SBMBBR 2 ($SBMBBR_1$, $SBMBBR_2$, $SBMBBR_3$) are initially empty of water.

The filling step 10 can be carried out via a tap at a low point of the reactors SBMBBR 2 or by a siphoning system in a low central position of the reactors SBMBBR 2 until the high filling level is reached. The filling step 10 can be implemented simultaneously or else sequentially in the three SBMBBR reactors 2. For each SBMBBR reactor 2, for example, the reactor $SBMBBR_1$, a mechanical stirring can be activated as soon as all the media of the first biomass have been sufficiently immersed to favor the stirring. Mechanisms of biological dephosphatation can then start through the presence of PAO bacteria, preferably DPAO bacteria present in the media of the first biomass. A degradation or reduction of soluble organic carbon present in the water during treatment is observed along with a releasing of soluble inorganic phosphorous. The filling step 10 can be rapid, lasting several (about 10) minutes or it can be slow, lasting up to 4 hours.

Figure 3:
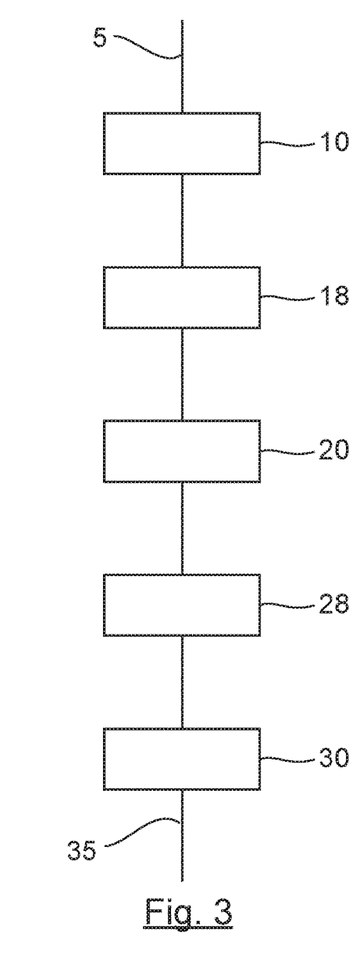
FIG. 3 represents the steps of the method according to the present invention furthermore comprising complementary steps of biological treatment.

Should the filling step 10 be rapid, and depending on the characteristics of the water to be treated for each SBMBBR reactor 2, referring to FIG. 3, the method may furthermore include a step of biological processing in anaerobic conditions 18 in the SBMBBR reactors 2 after the end of the filling step 10 for filling the SBMBBR reactors 2. This additional step is implemented in anaerobic conditions and with stirring. It enables an increased activation of the mechanisms of biological dephosphatation. It can be implemented for several tens of minutes up to three hours depending on the characteristics of the water to be treated 5.

The step of anoxic/aerobic biological treatment 20 relies on the working of the SBMBBR reactors 2 under predominantly anoxic conditions, the working of the MBBR reactor 2 under aerobic conditions and the continuous recirculation of each of the first effluents 215 of the SBMBBR reactors 2 with the effluent 225 of the MBBR reactor 3. In the present case, the first effluents 215 include the liquid fraction of water under biological treatment in anoxic conditions in the SBMBBR reactor 2 and generally include particles of suspended matter but do not contain the carrier media of the first biomass. Similarly, the second effluent 225 includes the liquid fraction of water under biological treatment in the MBBR reactor 3 and generally includes particles of suspended solids but does not contain the carrier media of the second biomass. The carrier media of the first biomass and the second biomass can easily be retained within their respective reactors 2, 3 during the continuous recirculation of the effluents 215 and 225 through perforated screens disposed in each of the reactors 2, 3. The diameter of the holes of the perforated screens makes it possible to let through the liquid fraction of the effluents 215, 225 as well as the suspended solids but retains the biomass carrier media. The step of anoxic/aerobic biological treatment 20 in the SBMBBR$_1$ 2 and MBBR 3, SBMBBR$_2$ 2 and MBBR 3 and SBMBBR$_3$ 2 and MBBR 3 can be implemented simultaneously or else sequentially in the three SBMBBR reactors 2. The total duration of the step of anoxic/aerobic biological treatment 20 between one of the SBMBBR reactors 2, for example SBMBBR$_1$ and the MBBR reactor 3, is variable and can be adjusted according to the characteristics of the water to be treated 5 or the water under treatment and on the nature of the first biomass and the second biomass. It could generally last from one hour to 8 hours.

The biological treatment 210 under predominantly anoxic conditions in the SBMBBR reactors 2 enables a denitrification to be carried out. The nitrates then present in the water under treatment in the SBMBBR reactors 2 are converted into diatomic nitrogen by means of the denitrifying bacteria at least partly forming the first biomass. If necessary, it is also this biological treatment that predominantly carries out a biological dephosphatation. The phosphorous/phosphate ions are absorbed by over-accumulation by the PAO micro-organisms, especially DPAO micro-organisms at least partly forming the first biomass. An elimination of soluble carbon is also observed. During the biological treatment 210, in predominantly anoxic conditions, the SBMBBR reactor 2 can be stirred by means of a mechanical stirrer. An aeration can also be activated temporarily during the treatment in order to ensure greater refinement of the phosphorous treatment.

The biological treatment 220 under aerobic conditions in the MBBR reactor 3 obtains a nitrification. The oxygen concentration could be included between 1 and 6 mg/L in the MBBR reactor 3 depending on the characteristics of the water to be treated and the nature of the last biomass.

Once the step of anoxic/aerobic biological treatment 20 is completed, the water treated by anoxic/aerobic biological treatment 20 is brought together in the SBMBBR reactors 2.

Referring to FIG. 3, a refining step of biological treatment 28 in the SBMBBR reactors 2 can sometimes be necessary after the step of anoxic/aerobic biological treatment 20. This additional step finalizes the denitrification and/or dephosphatation in the SBMBBR reactors 2. It generally takes place under anoxic and/or aerobic conditions. An aeration can also be activated during the treatment in order to ensure greater refinement of the phosphorous treatment.

The mechanical stirring, if it exists, of the SBMBBR reactors 2 is stopped. The draining step 30 in the SBMBBR reactors 2 is implemented by gravity of pumping at a low point of the reactor or again through a siphoning system at a central low position of the reactors. The carrier media of the first biomass are then maintained in the SBMBBR reactors 2 through the placing of perforated screens, the diameter of the holes of which enables the removal of the treated water 35 while at the same time preventing the passage of the carrier media.

An additional step of clarification (not shown) of the drained treated water 35 can follow the draining step 30. The structure for the additional step of clarification is however very compact because of the low concentration in suspended solids (SS).

Figure 4:
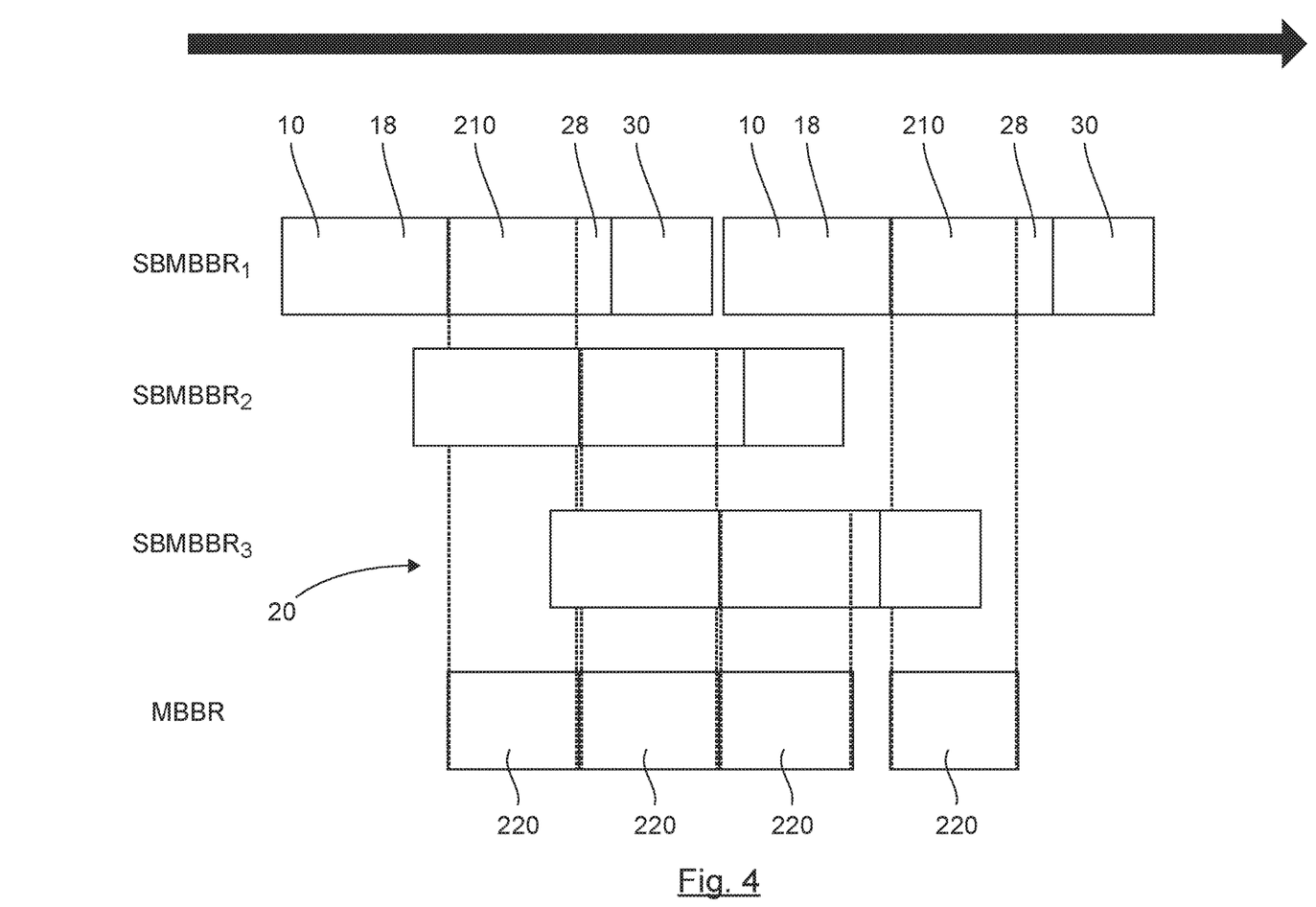
FIG. 4 represents a time lagging phasing that is particularly suited to the different steps of the method according to FIG. 3 for each of the reactors of the system of reactors of FIG. 1.

Referring to FIG. 4, the three SBMBBR reactors 2 are used with the method according to FIG. 3. The step of biological treatment 20 is implemented sequentially by the MBBR reactor 2 and in turn the reactors SBMBBR$_1$, SBMBBR$_2$ and SBMBBR$_3$. The SBMBBR reactors 2, for example SBMBBR$_1$, are placed in anaerobic conditions during the filling step 10 and the biological treatment step in anaerobic conditions 18. The SBMBBR reactors 2, for example SBMBBR$_1$, are then placed in anoxic conditions during the step of anoxic/aerobic biological treatment 20 (biological treatment in anoxic conditions 210) and then during the refining step of biological treatment 28. The start and the end of continuous recirculation of the effluents 215, 225 between the SBMBBR reactors 2 and the MBBR reactor 3 are indicated by dotted lines. Finally, the removal step 30 enables treated water 35 to be recovered. The steps of the method are shifted or lagged for the reactors SBMBBR 1, SBMBBR 2 and SBMBBR 3 in such a way that the step of anoxic/aerobic biological treatment (20) is implemented in alternation and successively in the reactor SBMBBR$_1$ 2 and MBBR 3, SBMBBR$_2$ 2 and MBBR 3 and SBMBBR$_3$ 2 and MBBR 3. The MBBR reactor 3 then works in a way that is on the whole continuous and only under aerobic conditions. The MBBR 3 thus provides optimally for optimized nitrification for the water to be treated in the reactors SBMBBR$_1$, SBMBBR$_2$ and SBMBBR$_3$.

The characteristics of the water to be treated 5 or the water under treatment can especially be measured by a certain number of indicators (the French measurement standards are indicated in brackets); the chemical oxygen demand (DCO or COD-NF T 90-101), the biological oxygen demand (DBO or BOD-NF EN 1899-1), the suspended matter or suspended solids (MES or SS NF T 90-105(2), NF EN 872), Kjeldahl nitrogen corresponding to the sum of the nitrogen in ammonia and organic form (NF EN25663), the quantity of ammonium (NF T 90-015), the quantity of nitrate ions (NF T 90-045), the quantity of phosphorous (NF EN ISO6878). In order to optimize performance during each of the steps of the method, the different reactors 2, 3 can be equipped with specific sensors or probes, especially to measure the redox potential, the diatomic oxygen concentration, the nitrate concentration, the ammonium concentration, and the phosphate concentration.

In the embodiment described here above, the first biomass and the second biomass are both carried on media. These media have a shape and surface characteristics specifically chosen to enable efficient adhesion of the first biomass, and the second biomass respectively to said carrier media. They are manufactured from synthetic materials and have a density close to that of water, preferably ranging from 0.9 to 1.1. This is a preferred embodiment of the invention since the biomass carried on media makes it possible to obtain especially robust biofilms resistant to variations in charge with an increased selection of micro-organisms of interest, and grows with a high concentration of micro-organisms. The method obtained is therefore flexible with respect to variations in charge, and is stable and robust. The corresponding installation is therefore very compact. It makes it possible especially to obtain an energy-competitive method adapted to the simultaneous treatment of carbon, nitrogen and phosphate, given that nitrification can thus be optimized and that dephosphatation can be mainly coupled with denitrification.

As an alternative to the embodiment described here above, the first biomass can be an activated-sludge type or granular type of suspended biomass. In this case, the SBR reactors 2 are not SBMBBR type reactors but suspended-biomass SBR type reactors. Although this is not a preferred embodiment, since the corresponding installation is in principle be less energy competitive and less compact, it can be envisaged especially in the case of the rehabilitation of already existing installations. Certain differences to be taken into account are especially the fact that the first suspended biomass or granular biomass type of biomass is present in the suspended biomass or granular biomass SBR reactors 2 as well as in the MBBR reactor 3 during the step of anoxic/aerobic biological treatment 20. The first suspended biomass or granular biomass type of biomass is less robust, less resistant to variations in charge with a less substantial selection of micro-organisms of interest since it is alternately in aerobic and in anoxic conditions and grows in lower concentrations of micro-organisms. In addition, a decantation or settling step, which may be lengthier or shorter depending on the speed of settling of the first suspended biomass or granular type of biomass, must be carried out before the draining step 30. The draining step 30 can be implemented by means of buckets. In this alternative embodiment, the second biomass is a biofilm on media remaining permanently in the MBBR reactor 3, thus giving optimized nitrification and therefore giving installations of smaller volume than in the prior art.

7. CONCLUSIONS ON ADVANTAGES PROVIDED BY THE INVENTION AS COMPARED WITH THE PRIOR ART TECHNIQUES

Compared with the prior-art methods that use only a suspended-biomass SBR reactor (of the conventional or hybrid type), the method according to the invention has especially the following advantages (in the case especially where the SBR reactors of the reactor system are suspended biomass or granular biomass SBR reactors):

It enables better nitrification because the MBBR is aerated continuously and includes a dedicated nitrifying biomass on biofilm. The consequence of this is that the cycle in the SBR reactors are shorter, inducing a gain in volume of the corresponding installations.

It reduces the minimum sludge age of the suspended biomass. Indeed, the system of MBBR-SBR reactors according to the present invention comprises on the whole less suspended biomass than an prior art SBR reactor with suspended or granular biomass. In addition, the MBBR reactor makes it possible to maintain high nitrification performance through its nitrifying biofilm. This induces a gain in volume of the corresponding installations;

The nitrifying biofilm of the MBBR reactor is more robust than the suspended biomass of the prior-art suspended biomass or granular biomass SBR reactors and enables better management of sudden increases in charge to be nitrified since it is almost exclusively dedicated to nitrification. This implies a greater robustness and a better management of ammonia load peaks by the corresponding installations.

As compared with the prior-art methods using only an IFAS-SBR reactor, the method according to the present invention has especially the following advantages (in the case especially where the SBR reactors of the system of reactors are suspended biomass or granular biomass SBR reactors):

The MBBR reactor works continuously without a settling phase in which the media take a great deal of place and leads to a limit on the volume of water that can be treated. This induces a gain in volume of the corresponding installations;

An installation can be easily rehabilitated by simple modification of configuration between reactors, the SBR reactors having no need of being drained and immobilised during the reconfiguration. This therefore means that the method according to the present invention can be easily implemented in an existing installation.

In comparison with the prior art methods using only an SBMBBR reactor, the method according to the present invention has especially the following advantages (when the SBR reactors of the system of reactors are SBMBBR type reactors):

- the presence of carriers to support the first biomass makes it possible to remove a step of settling the sludges in the SBMBBR reactors;
- the biological dephosphatation (in SBMBBR) and the nitrification (in MBBR) are uncoupled thus eliminating competition between the dephosphating and nitrifying populations relative to diatomic oxygen. Thus, the nitrification can be implemented more efficiently and can be completed more rapidly, implying shorter cycles of operation for the SBMBBR reactors and therefore a gain in volume of the corresponding installations;
- in the same way, the SBMBBR reactors have shorter cycles, the organic loads applied are greater, the biofilm is therefore thicker, thus favoring the obtaining of an anoxic zone in the biofilm and therefore favoring denitrification;
- the recirculation of the nitrate ions produced in the MBBR reactor towards the SBMBBR reactors enables the dephosphatation to be mainly carried out by consumption of the nitrate ions by DPAO micro-organisms present in the SBMBBR reactors rather than by consumption of diatomic oxygen by PAO micro-organisms. This implies lower consumption of diatomic oxygen and therefore a gain in energy for the corresponding installations.

The invention claimed is:

1. A method of biologically treating water containing carbon and nitrogen in a system of reactors comprising at least first and second sequencing batch reactors (SBR) disposed in parallel and one moving bed biofilm reactor (MBBR), the method comprising the steps of:
 filling each of the SBRs with water to be treated;
 biologically treating the water under predominantly anoxic conditions by a first biomass in the first and second SBRs, with each SBR producing a first effluent, and wherein said first biomass comprises mainly heterotrophic denitrifying microorganisms;
 biologically treating the first effluent continuously and solely under aerobic conditions in the MBBR, the MBBR producing a second effluent and directing the second effluent back to the first SBR or the second SBR, and wherein said second biomass comprises a biofilm with predominantly nitrifying biofilm carried on media;
 continuously recirculating the first and second effluents between said MBBR and each of said first and second SBRs sequentially, wherein in one sequence the continuously recirculating of the first and second effluents is between the first SBR and the MBBR and in another sequence the continuously recirculating of the first and second effluents is between the second SBR and the MBBR, such that the biologically treating under anoxic conditions and the biologically treating under aerobic conditions take place by turns between said MBBR and each of said first and second SBRs sequentially.

2. The method of claim 1 wherein the step of filling each of the first and second SBRs is implemented under anaerobic conditions and wherein a step of biologically treating under anaerobic conditions in the first and second SBRs is implemented before said steps of biologically treating under anoxic conditions and biologically treating under aerobic conditions.

3. The method of claim 2 wherein said step of filling each of said first and second SBRs has a duration of ten minutes to four hours and wherein said step of biologically treating under anaerobic conditions has a duration of ten minutes to three hours.

4. The method of claim 1 wherein said first biomass comprises denitrifying polyphosphate accumulative organisms.

5. The method of claim 1 wherein said steps of biologically treating under anoxic conditions and biologically treating under aerobic conditions have a total duration of one hour to eight hours.

6. The method of claim 1 wherein said first biomass is a suspended or granular biomass or a biofilm carried on media.

7. The method of claim 1 wherein the concentration in diatomic oxygen dissolved in said second effluent is 1 milligram to 6 milligrams per liter.

* * * * *